Feb. 18, 1958 R. A. KENDALL 2,823,433
TONGUE AND GROOVE PLYWOOD
Filed Feb. 28, 1955
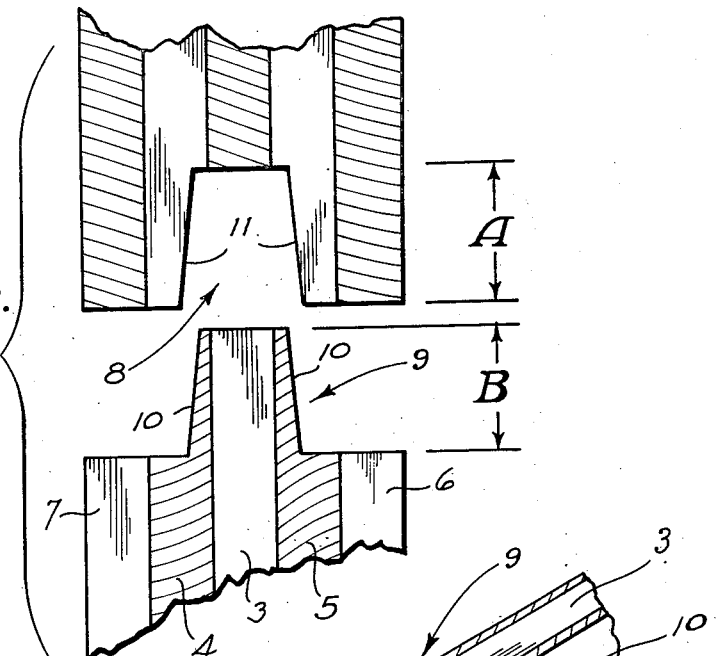
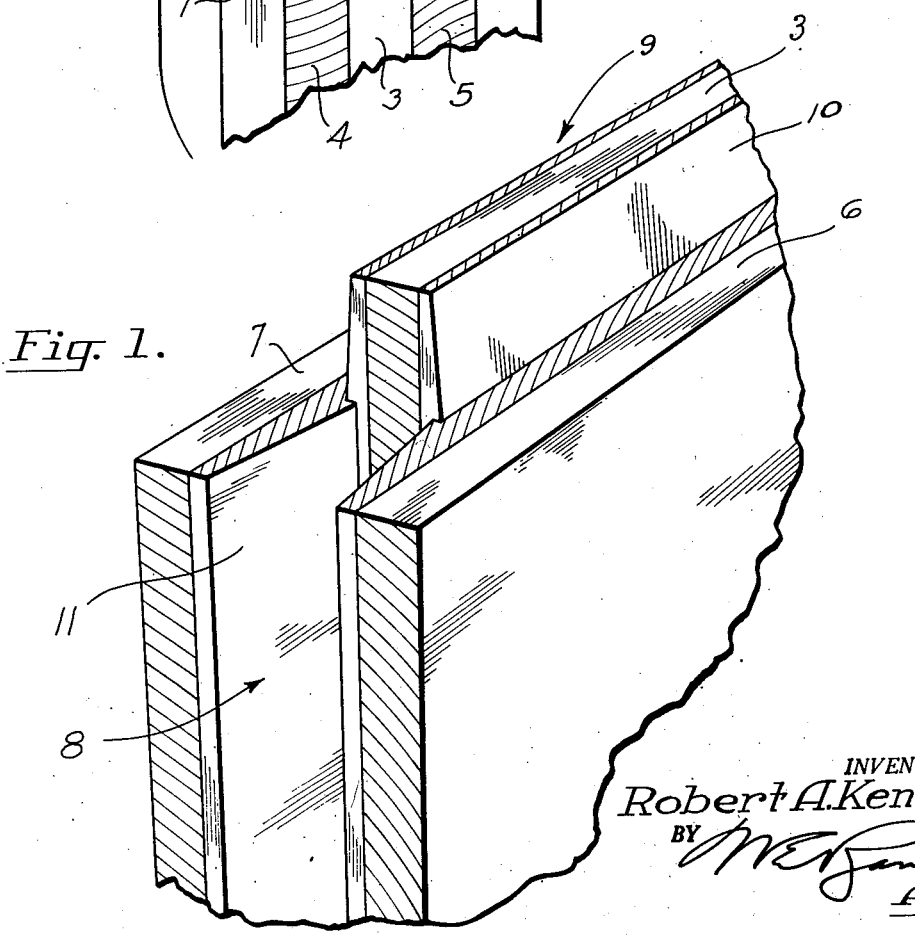
INVENTOR.
Robert A. Kendall
BY
Atty.

United States Patent Office 2,823,433
Patented Feb. 18, 1958

2,823,433

TONGUE AND GROOVE PLYWOOD

Robert A. Kendall, Vancouver, Wash., assignor to Vancouver Plywood Co., Vancouver, Wash., a corporation of Washington Application February 28, 1955, Serial No. 490,909

3 Claims. (Cl. 20—92)

This invention relates to tongue and groove joinder means of superior structural strength for plywood whereby pieces of scrap and substandard size can be salvaged for use as subflooring, subwalls, and elsewhere in locations where structural strength is more important than decorative appearance.

One object of my invention is to provide for plywood a tongue and groove joinder means which is of superior structural strength in resistance to shear forces imposed in a direction through the thickness of the plywood from either face.

Another object of my invention is to provide a wear surface on both exposed faces of both the tongues and the grooves in a plywood joinder structure whereby working or movement of individual pieces due either to handling or to expansion and contraction will not shatter, splinter or otherwise weaken the joint.

In the coastal regions of northern California, Oregon, Washington, and British Columbia, the production of plywood is a major industry. The typical plywood board is fabricated from a number of thin layers of veneer which are glued together so the grain in each layer is at right angles to that of its neighbor. In size, a major portion of all plywood boards produced are a standard four feet by eight feet although other special sizes are not entirely unknown in the industry. At the same time, the manufacturing process which produces the standard four by eight board also frequently produces scrap pieces, short lengths or odd sizes due to imperfections or manufacturing inaccuracies. The building trades, however, have very little use for plywood scrap. Accordingly, it is difficult to dispose of and the marketing of scrap often results in a financial loss to the mill. For this reason, the plywood industry has for years been searching for a method economically to salvage, utilize or dispose of scrap plywood in large volume without a financial loss. The instant invention is directed to a solution of this problem through provision of a novel tongue and groove joint. This joint has proven effective in the salvage of scrap plywood and in the conversion of such scrap to small pieces and panels which can be used for subflooring, subwalls, sheathing, and otherwise where structural strength and a tight seal are required yet where multiple joints are not a decorative disadvantage.

In the above exemplary uses, structural strength is more important than the decorative appearance or the number of joints exposed in the final construction. Selecting a subwall as exemplary, it heretofore has been considered necessary to employ full size four by eight plywood boards which correspond in length to a multiple of the normal two foot stud spacing in a building wall. This has been considered necessary so that the ends of the plywood boards could be nailed to the studs. With substandard or scrap plywood, on the other hand, a joint may fall intermediate the studs, the ends then cannot be nailed in place and the industry thus refuses to employ odd sizes. In my experimentation, however, I have found that the heart of the problem is to find a joinder means such as a tongue and groove structure which provides sufficient lateral stability and resistance to shear forces in either direction that the marginal edges do not have to overlie and be nailed to the studs. A subwall jointed tightly in this manner would not need to have the ends overlying a stud since the strength of the joint itself could be relied upon a resist shear forces intermediate the studs.

It is a common practice in the building trades to join various boards, blocks, panels, and the like with a tongue and groove joint. In the plywood industry, such a tongue and groove joint heretofore has been provided in various ways. One common method is by offsetting the core of the plywood relative to the face plies so the core serves as a tongue and the recess which results from the offset serves as a groove mated to the tongue. This offset construction, however, is impractical to fabricate when the object is to utilize scrap and substandard pieces of plywood since it is impossible beforehand to determine which piece later will turn out to be a scrap piece.

A second suggested solution to the provision of tongue and groove joinder means is disclosed in United States Patent 2,257,048 to C. C. Fulbright. This patentee has incorporated a different tongue and groove construction in a floor block. Thus, he splits one ply so the tongues comprise portions of two of the plies and the grooves are mated thereto and also are formed from portions of two plies. This produces a floor block joint in which the opposed faces of the tongues and the grooves are different plies arranged at right angles to one another. Such a construction appears to be practical in a floor block which can be nailed immediately adjacent the joints since the strain imposed is unidirectional. The same joint, however, is impractical and is possessed of insufficient structural strength when applied to scrap pieces used as subflooring or a subwall. The most apparent difference in these two uses, of course, is that a floor block is supported across substantially the full face thereof by a subflooring. The subfloor or subwall itself, on the other hand, is supported only at spaced points upon joists or studs and thus cannot be nailed except to these spaced members. It thus is one important object of my invention to provide a tongue and groove joinder means for plywood which is an improvement upon the construction disclosed in the said Fulbright patent and which is practical for incorporation in pieces of plywood which must resist shear from either direction without nail support.

To the above ends, it will be recognized that the thin layers of the veneer from which the plywood board is fabricated are glued together so the grain of each layer is at right angles to that of its neighbor. The glue itself forms a bond between plies which actually is stronger than the structure of the plywood itself. Taking advantage of these two facts, my piece of plywood includes a mated tongue and groove joinder means which is formed about the periphery of each piece such that a tongue projects from two adjacent sides and a groove is recessed in the other two adjacent sides. Each of these tongues and each of the grooves is formed with a dado head, router or similar tool to produce tongues and grooves symmetrical about a plane through the center of and parallel to the center core. Assuming for example that the plywood piece incorporating my invention is five ply, it is formed from a center core, two intermediate plies, and two face plies. With this five ply, I remove both face plies and a portion of the intermediate plies to a preselected depth so as to form each tongue with a full width of the center core and an equal fractional portion of the width of each intermediate ply adjacent to the center core. This produces a tongue which is three ply in construction and is sheathed or faced with a wear surface on each side arranged normal or at right angles to the center core. In similar manner, each of my grooves is formed by completely rabbeting away the center core to the depth of the groove and by further removing a fractional portion of each of the intermediate plies. This produces a groove which is bounded on either side by the full width of a face ply and by an equal fractional portion of the width of each intermediate ply adjacent to the center core. Thus, the groove is bounded by two ply projections and is provided with wear faces formed from veneer arranged at right angles to the face plies. The provision of this type of a tongue and groove construction is one object of my invention.

As an additional feature of my invention, the depth of each groove is formed so as to exceed by a slight amount the length of each tongue in order to assure a flush fit of the exposed face plies. Still further, each tongue and each groove is formed upon a uniform complementary taper which is bounded by plane or flat surfaces. These plane surfaces converge upon the tongue structure and diverge upon the groove structure progressing from adjacent the center of the piece of plywood toward the peripheral edges. As an inspection of the drawings will make apparent, all of these bounding plane surfaces form equal acute angles with a plane through the center of and parallel to the center core. Thus, the tongues fit the grooves tightly and with a wedge like action thereby eliminating the requirement that a joint overlie a stud or joist when the plywood is employed in the building trades. Provision of the above described structural features is a further object of my invention.

The advantages born of the above construction and which form the substance of my improved piece of plywood are directed primarily to the provision of a structurally superior tongue and groove joint. A tongue and groove joint which is symmetrical about a plane through the center of the center core allows the individual pieces to be applied with either face exposed to the expected direction of application of the shear forces. Optionally, such a joint can be applied where shear forces are anticipated in either or both directions. That is to say, each tongue consists of a full width center core bounded on both sides by a fractional portion of the width of each intermediate ply. Each groove is mated to such a tongue and the assembled joint in an exemplary five ply piece thus carries seven plies across the joint itself. This seven ply construction, by virtue of its symmetry, strength and force fit, will resist shear forces applied in a direction normal to the face of the plywood in either direction. This is an important advantage and is within the scope of my invention.

These and other objects and advantages of my invention will become apparent during consideration of the following detailed description, taken in conjunction with the accompanying drawings, wherein:

Fig. 1 is an enlarged perspective view showing one corner of a piece of plywood having incorporated thereon one tongue and one groove of the mated joinder means of my invention; and Fig. 2 is a detail cross section view through a first piece of plywood having a tongue and a second piece having a groove with these joinder means arranged opposite one another immediately prior to assembly.

The piece of scrap plywood illustrated in the drawings is rectangular and contains five individual plies since that is the minimum number of plies with which the structure of the instant invention can be incorporated. To this end, the plywood contains at least a center core 3, two intermediate plies 4 and 5, and two face plies 6 and 7. As is conventional in plywood, the grain of adjacent plies is arranged normal or at right angles. Thus, the grain of the center core 3 and the two face plies 6 and 7 are parallel. The grain of the two intermediate plies 4 and 5 are parallel one another but are at right angles to the previously named three plies. In any event, it will be understood that the board or piece of plywood originally is fabricated without the tongue and groove joinder elements illustrated in the drawings. Instead, these elements are formed later by a method now to be described.

To the above end, two adjacent sides of each rectangular piece of plywood carry a groove 8 and two carry a tongue 9. These are formed with a dado head or similar routing tool simply by feeding the piece of plywood endwise between fixed parallel heads to form a tongue 9 and a single fixed head to form a groove 8. A different type of tongue and groove joinder has been formed in the past by offsetting the center core from the intermediate and face plies when the board first is laid up. However, in the utilization of scrap pieces and panels, it cannot be anticipated which of the full size boards or panels eventually will be rejected, broken or scrapped. Accordingly, the core offset method of forming a joint is impractical and a dado head or other routing tool is employed.

Referring more particularly to the structure of a single tongue 9, it will be noted that this element is symmetrical about a plane which passes through the center of and is parallel to the center core 3. In addition, each tongue includes the full width of the center core 3 and an equal fractional portion of the width of each intermediate ply 4 and 5 adjacent to the center core. By a correct positioning of the dado or routing tool, there will be removed from the two intermediate plies 4 and 5 a preselected fractional portion of the total width thereof. In Fig. 1, the remaining portion of each intermediate ply defines a plane surface 10. Either by tilting a conventional routing head or utilizing a tapered routing head, I am able to form the plane surfaces 10 so they converge in a direction proceeding from adjacent the center of the piece of plywood toward the peripheral edges. This produces a tapered tongue best shown in Fig. 2 of the drawings.

Referring now to a typical groove 8, this is formed by effecting a complete removal of the center core 3 to the depth of the groove. In addition, each side of the groove is bounded by the full width of a face ply 6 or 7 and by an equal fractional portion of the width of each intermediate ply adjacent to the center core. As shown in the drawings, the removal of a portion of the intermediate ply leaves two opposed plane surfaces 11 which define wear surfaces. These plane surfaces 11 diverge progressing in a direction from adjacent the center of the piece of plywood toward the peripheral edge. A precise taper most easily is produced by employing a tapered routing tool. Thus, it is important that all of the plane surfaces 10 and 11 lie at equal acute angles to a plane through the center of and parallel to the center core 3. As is shown in Fig. 2, this produces a joinder construction in which each tongue 9 will fit exactly and precisely within the tapering width of each groove 8.

At this point, it should be noted that I prefer to form each groove 8 so the depth thereof exceeds by a slight amount the length of each tongue 9. In Fig. 2 this difference in length is indicated by dimension arrows such that the dimension A exceeds the dimension B. Accordingly, when a tongue is fitted tightly to a groove, the end of the tongue is positioned just short of the bottom of the groove at the moment that the face plies come into flush abutment. This arrangement assures a flush fit of the exposed face plies and accommodates both minor manufacturing inaccuracies and a limited amount of contraction and expansion of the plywood sheet or a swelling and contraction under conditions of varying moisture.

During the manufacturing process in a typical plywood mill, there are many occasions which require that a full panel, a substandard piece, a small piece, or a broken piece of plywood be rejected or discarded. This scrap material often can be trimmed to provide a smaller piece which is structurally sound yet is too small to be marketed in the normal manner. By utilizing the tongue and groove joinder means of the instant invention, these scrap pieces can be salvaged in a manner now to be described.

To the above end, all those scrap pieces having a clear or sound area at least two feet by two feet are sorted out and then are trimmed to eliminate the imperfections. Thereinafter, the trimmed pieces are processed so as to form the grooves 8 and tongues 9 with dado heads or other routing tools. Exemplary dimensions on the finished scrap pieces may be eight feet in length by two feet wide, four feet by four feet, and two feet by two feet. In actual practice, some mills may prefer to confine these salvage operations to pieces which can be trimmed to a two feet module where the end use is in the building trades. This allows a fitting together of individual pieces to produce a rectangular or square covering which conforms to stud or joist spacing but it is not a requirement and other modules or other dimensions can as easily be salvaged. In any event, the tongues 9 on the finished pieces are fitted to the grooves 8 of adjoining pieces in assembling a subfloor, subwall, or the like and those pieces which form the margins or peripheries are trimmed to fit the available space. The carpenter laying up the subfloor or subwall need not be concerned about the spacing of the joints since at least a portion of each piece will overlie a stud or joist. Each joinder structure where a tongue 9 mates with a groove 8 possesses sufficient structural strength to resist displacement without being nailed to the studs or joists. That is to say, as each piece is laid up and nailed in place, the tongue and groove joinder of the next piece is driven home with a force fit until the face plies 6 and 7 come into abutment. In this position of the parts, the joint itself becomes a close fitted seven ply construction since each tongue 9 carries two wear surfaces formed from the intermediate plies and each groove 8 also carries two separate wear surfaces formed from the same plies. When mated, this joinder structure is of superior structural strength in resistance to shear forces imposed in a direction through the thickness of the plywood from either face. It thus will not shatter or break short of a force being applied which would be sufficient unto itself to break the main body of the plywood panel. Further, the entire subfloor or subwall becomes substantially one integral panel in which the force fit of the joints is maintained by the nailing intermediate the joints.

In summary, the wear surfaces which define the faces of both the tongues and grooves are at right angles or are normal to the full plies lying immediately adjacent thereto. Accordingly, the strength of three normal plies is imparted to each individual protruding section of the joinder structure. By actual test, this joinder and wear surface arrangement resist breaking, chipping, cracking, and structural failure even when the plywood pieces are subjected to severe shear forces or are handled roughly during shipment. Furthermore, the tongues and the bounding structure for the grooves will not split off since the grain of the plies incorporated therein are at right angles to one another. By providing this simple structure and one which is symmetrical about a plane through the center of the center core, I am enabled to utilize the salvaged pieces of plywood with either face exposed and to effect a considerable saving of money to the plywood mill through a salvaging of scrap material.

I claim:

1. In a piece of plywood having at least a center core, two intermediate plies and two face plies, a mated tongue and groove joinder means formed about the periphery of the plywood and carrying wear surfaces in which the grain is normal to the adjoining plies, said joinder means including a projecting tongue formed upon two sides and a recessed groove formed upon the other two sides of said plywood piece, each said tongue and each said groove being symmetrical about a plane through the center of and parallel to said center core so as to provide equal resistance to shear forces imposed normal to either face ply, each said tongue being at least three ply and including the full width of a center core and at least an equal fractional portion of the width of each intermediate ply adjacent to the center core to define said wear surfaces, each said groove having the center core completely removed to the depth of the groove and being bounded on each side by at least a two ply construction including the full width of a face ply and at least an equal fractional portion of the width of each intermediate ply adjacent to the center core to define said wear surfaces.

2. In a rectangular piece of salvaged plywood having at least five plies, a center core, two intermediate plies, and two face plies, the grain of adjacent plies being arranged normal to one another, a mated tongue and groove joinder means formed about the periphery of the plywood and including a projecting tongue formed upon two sides and a recessed groove formed upon the other two sides, each said tongue and each said groove being symmetrical about a plane through the center of and parallel to said center core, each said tongue including the full width of said center core and an equal fractional portion of the width of each intermediate ply adjacent to the center core, each said groove having the center core completely removed to the depth of the groove and being bounded on each side by the full width of a face ply and an equal fractional portion of the width of each intermediate ply adjacent to the center core, the depth of each groove exceeding by a slight amount the length of each tongue to assure a flush abutment of said face plies when a tongue is fitted to a groove, and each said tongue and groove being formed upon a uniform complementary taper.

3. A rectangular piece of plywood of substandard size, comprising a center core, two intermediate plies, and two face plies, the grain of adjacent plies being arranged normal to one another, a mated tongue and groove joinder means formed about the periphery of the plywood and including a projecting tongue formed upon two adjacent sides and a recessed groove formed upon the other two adjacent sides, each said tongue and each said groove being symmetrical about a plane through the center of and parallel to said center core, each said tongue including the full width of said center core ply and an equal fractional portion of the width of each intermediate ply adjacent to the center core, each said groove having the center core completely removed to the depth of the groove and being bounded on each side by the full width of a face ply and an equal fractional portion of the width of each intermediate ply adjacent to the center core, the depth of each groove exceeding the length of each tongue by a slight amount to assure a flush fit of the exposed face plies, and each said tongue and groove being formed upon a uniform complementary taper bounded by plane surfaces which converge upon the tongues and diverge upon the grooves progressing from adjacent the center of the piece of plywood toward the peripheral edges, all of said bounding plane surfaces forming equal acute angles with said plane through the center of and parallel to the center core.

References Cited in the file of this patent

UNITED STATES PATENTS

| | | |
|---|---|---|
| 1,928,547 | Strong | Sept. 26, 1933 |
| 1,939,528 | Swift | Dec. 12, 1933 |
| 2,256,836 | Potchen | Sept. 23, 1941 |
| 2,257,048 | Fulbright | Sept. 23, 1941 |
| 2,387,659 | Hafsos | Oct. 23, 1945 |